J. R. TYSON.
VEHICLE JACK.
APPLICATION FILED JAN. 18, 1910.
1,003,164.
Patented Sept. 12, 1911.
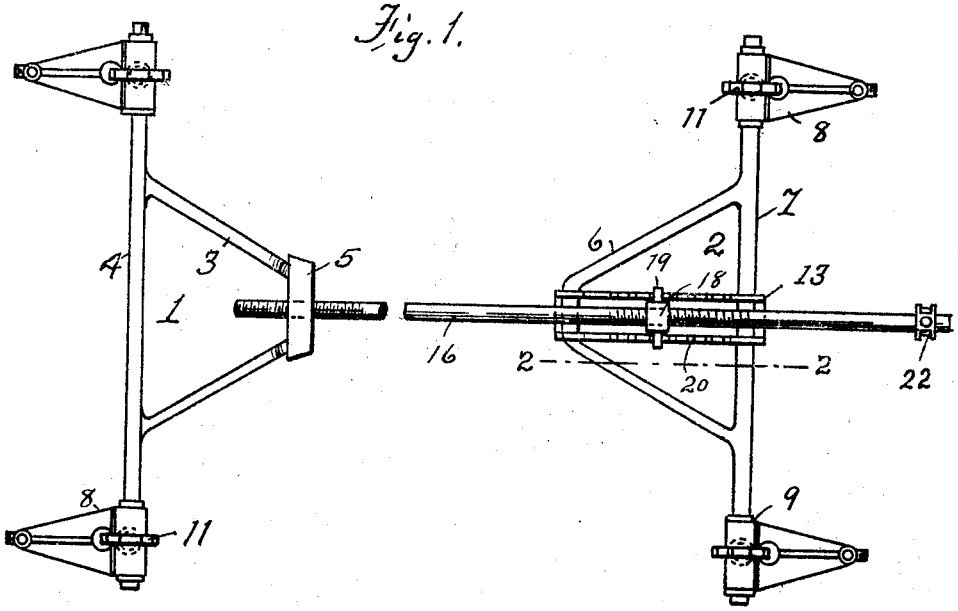
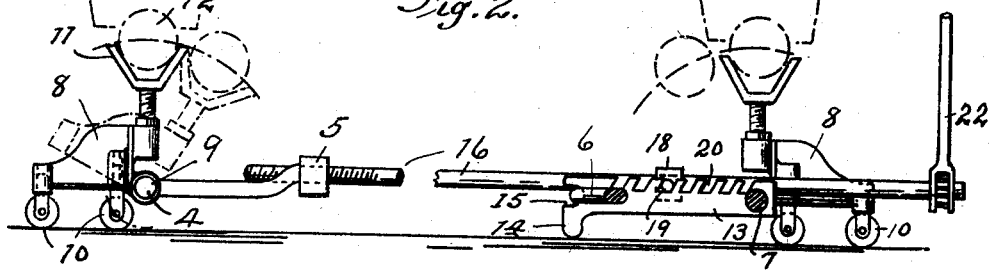
JAMES R. TYSON, Inventor

UNITED STATES PATENT OFFICE.

JAMES R. TYSON, OF READING, PENNSYLVANIA, ASSIGNOR OF THREE-FIFTHS TO FREDERICK S. YODER, OF READING, PENNSYLVANIA.

VEHICLE-JACK.

1,003,164.      Specification of Letters Patent.      Patented Sept. 12, 1911.

Application filed January 18, 1910. Serial No. 603,220.

*To all whom it may concern:*

Be it known that I, JAMES R. TYSON, citizen of the United States, residing at Reading, in the county of Berks and State of Pennsylvania, have invented certain new and useful Improvements in Vehicle-Jacks, of which the following is a specification.

This invention relates to improvements in vehicle jacks and the object in the present invention is to provide a device for elevating a vehicle, such for instance as an automobile, from the ground.

The object in this device is to raise the vehicle in its entirety and without tilting it, and this is accomplished by engaging both axles of the vehicle at points just inside the wheels, and raising them in unison.

The invention consists of four jack blocks, each carrying a fork adapted to engage the axle and pivotally mounted on a frame, which frame is in two sections and which are moved toward each other by means of a screw rod which engages both sections and which is provided with means for turning it.

The invention is more fully described in the following specification and clearly illustrated in the accompanying drawing, in which:—

Figure 1 is a plan view of my device. Fig. 2 is a side elevation thereof showing the outline of a vehicle in position thereon.

The numeral 1 designates the forward frame section and 2 the rear frame section. The forward section is formed with a V-shaped brace 3 connected to the cross-rod 4, and provided at its apex with a screw-threaded head 5. The rear section 2 is also formed with a V-shaped brace 6, which is made in a single piece and which is secured to the rear cross-rod 7. Each of the cross-rods is provided at each end with a jack block 8, being pivoted thereon at 9. Each of these blocks is provided with a pair of casters 10 which will permit the blocks to move in any direction on the floor. Each of the blocks is provided in its upper face with a vertically adjustable fork 11, adapted to engage the vehicle axles 12.

The rear frame section 2 is provided with a rack 13 whose rear end is engaged by the cross-rod 7 passing through it and whose forward end is formed with a foot 14 which rests on the floor and which is formed with a depression 15 for engaging the forward end or apex of the V-shaped portion 6.

An operating rod 16 lies between the two vertical walls of this rack and at this point is provided with a right-hand screw thread, and a nut 18 engages this threaded portion, which nut is provided with side pins 19 which engage the teeth 20 in the upper face of the rack. The forward end of the rod 16 is screw-threaded with a left-hand thread and engages the head 5. The rear end of the rod is provided with a suitable turning means, as for instance a hand ratchet 22.

When a vehicle is to be raised, the blocks 8 are turned inwardly, as shown in dotted lines, until the forks engage the axles, which action will raise the outer ends of the blocks from the floor; the pins on the nut 18 are made to engage the rack teeth by lowering the rod 16, which is capable of vertical movement at the rear end; the ratchet is operated and the rod 16 will, through the right-hand thread at the rear and the left-hand thread at the front, draw the frame sections 1 and 2 toward each other. This action will cause the blocks 8 to turn on their pivotal connections with the cross-rods and the continued movement of the rod 16 will raise the vehicle until the outer ends of the blocks rest on the floor, as shown in Fig. 2, with both casters in each block bearing on the floor surface. These casters, being free to turn in the blocks, will permit the vehicle, when raised, to be moved in any direction over the floor.

The device will adapt itself to vehicles of different lengths, as, in applying it to the axles, the operating rod is raised until the pins 19 are free from the ratchet teeth, which separates the front from the rear frame section. The forks are adjusted to the axles and the rod dropped until the pins engage the teeth, which form the connecting means between the two frame-sections.

Having thus fully described my invention, what I claim and desire to secure by Letters Patent is:

In a vehicle jack, two independent frame sections each provided with an inwardly projected V-shaped brace; an internally screw-threaded head piece on one brace; a toothed rack carried by the other brace; an operating rod; a nut on the rod adapted to engage the teeth on the rack, said rod being screw-threaded in opposite directions where it passes through the head piece and the nut; means for turning the rod; each of the frame sections being supported on a pair of jack blocks; each block supported on a pair of casters and being capable of pivotal movement on its connection to the frame; and a fork adjustably secured in each block adapted to engage the axles of a vehicle.

In testimony whereof I affix my signature, in presence of two witnesses.

JAMES R. TYSON.

Witnesses:
 ED. A. KELLY,
 E. B. WELDER.